Patented Sept. 12, 1950

2,522,042

UNITED STATES PATENT OFFICE 2,522,042

PRODUCTION OF GELATIN SOLUTIONS OF INCREASED VISCOSITY

Frank J. Kaszuba, Binghamton, N. Y., assignor to General Aniline & Film Corporation, New York, N. Y., a corporation of Delaware No Drawing. Application October 5, 1948, Serial No. 52,980

4 Claims. (Cl. 260—8)

The present invention relates to a method of increasing the viscosity of solutions of gelatin and to modified aqueous gelatin solutions which have a greater viscosity than the untreated gelatin. More particularly, the invention relates to increasing the viscosity of photographic gelatin such as is employed as a carrier in the production of light-sensitive photographic emulsions. My invention also relates to light-sensitive gelatino photographic emulsions in which the viscosity of the emulsions has been increased.

It is at times desirable to coat a film base with a photographic silver-halide emulsion layer having a thickness greater than that obtainable under ordinary conditions. This can be accomplished by increasing the gelatin concentration of the emulsion. However, such a procedure has the disadvantage that it in effect dilutes the silver-halide content of the emulsion which is undesirable since the contrast of the photographic image obtained on such a film is lowered.

It is among the objects of my invention to produce photographic emulsion layers of greater thickness without increasing the gelatin concentration and thereby without diluting the silver-halide content of the emulsion.

It is among the other objects of my invention to increase the viscosity of aqueous gelatin solutions, to provide modified gelatin solutions having greater viscosity than untreated gelatin solutions and to provide photographic emulsions of increased viscosity.

The above and other objects are accomplished according to my invention by incorporating into a gelatin solution a maleamic resin which may be represented by the following general formula:

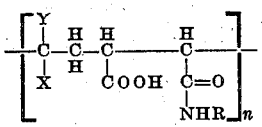

wherein X represents R'COO— or —COOR'', R' and R'' represent alkyl radicals, such as for example, methyl, ethyl, propyl, butyl, or amyl. Y represents hydrogen or an alkyl group as, for example, methyl, ethyl, or propyl, isopropyl, amyl, and similar radicals. R represents an alkyl, aryl, aralkyl or cycloaliphatic radical as for example methyl, ethyl, butyl, dodecyl, phenyl, benzyl, or cyclohexyl radicals. The —NHR radical in the above formula may be replaced by an N-heterocyclic radical such as, for example,

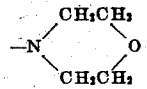

As an example of a resin, which I have found highly effective for increasing the viscosity of gelatin is one prepared by copolymerizing vinyl acetate with maleic anhydride and then reacting the resulting product with butylamine. Similarly, effective maleamic resins are obtained when the vinyl acetate maleic anhydride copolymer is reacted with other amines such as, for example, methyl-, ethyl-, propyl-, isopropyl-, butyl-, amyl-, cyclohexyl-, or benzylamine or aniline or morpholine.

Instead of employing vinyl acetate in forming the resin it may be replaced by an ester of acrylic or α-substituted acrylic acid such as methylacrylate or methylmethacrylate. Thus, I have also found the resin obtained by copolymerizing maleic acid and methylmethacrylate and reacting the product with butylamine or any one of the above mentioned amines to be effective as gelatin viscosity increasing agent.

The viscosity of aqueous gelatin solutions is greatly increased even when the resin is employed in such solutions in extremely small amounts. Thus, even when present in amounts as little as 0.25% based on the dry weight of the gelatin, the resulting gelatin solution has a considerably increased viscosity as compared with the untreated gelatin solution. In practice, it is not necessary to use the resin in an amount greater than 5% based on the dry weight of the gelatin. However, if it is desired, larger amounts of the viscosity modifier may be employed. In general, the amount of the resin admixed with the gelatin will depend on the amount of increase of viscosity desired and to some extent on the nature or source of the gelatin itself. Thus greater increases in viscosity are obtained in the case of bone gelatin than in the case of hide gelatin when employing the same amount of resin.

The resin may be admixed with the gelatin solution at any phase during the manufacture or the treatment of the gelatin in order to provide the desired viscosity of the gelatin solution. Thus, one may start with a gelatin solution which does not possess the viscosity necessary as, for example, in the making of a photographic emulsion. To obtain the necessary viscosity one merely adds and by thorough mixing incorporates such an amount of the resin into the gelatin as will impart the desired viscosity value thereto.

Thus, in the preparation of light-sensitive photographic emulsions, the silver-halide salts may be first prepared from the usual alkali metal halide salts, such as, ammonium bromide, potassium iodide, potassium bromide, potassium chloride, sodium chloride, and silver nitrate in an aqueous gelatin solution, and to this emulsion is then added the resin for the purpose of increasing the viscosity of the gelatin. In this manner, the viscosity of the gelatin emulsion can be increased considerably without appreciably increasing the total solids content.

The following examples will serve to illustrate the method of increasing the viscosity of gelatin solutions according to my invention.

Example I 10 parts of hide gelatin and 0.5 part of a resin prepared according to Example 5 were mixed in 90 parts of water. The mixture was allowed to stand for one hour in a water bath at about 50° C. The temperature of the solution was then adjusted to 42° C. and it was transferred to a gelatin viscosimeter of the Dudley type. The viscosimeter was then immersed in a constant temperature bath set at 41.6° C., and after allowing the gelatin solution to reach the same temperature, the time required for it to flow out of the pipette was determined, with the following typical results:

|  | Seconds |
|---|---|
| Gelatin solution alone without resin | 46.6 |
| Gelatin solution with resin | 57.3 | or an increase in viscosity of 10.7 seconds. When solutions of bone gelatin were treated with the resin, even greater increases in viscosity were obtained than in the case of hide gelatin.

Example II

Five-tenths part of a copolymer of methylmethacrylate and maleic anhydride treated with butylamine as prepared in Example 6, were mixed with 10 parts of gelatin and 90 parts of water and permitted to stand for one hour in a water bath at 50° C. When the viscosity of this solution was measured according to the procedure of Example 1, it was found to be much greater than the viscosity of the untreated gelatin solution.

In the preparation of gelatino-silver-halide emulsions, the viscosity increasing resin may be admixed with the gelatin containing the light-sensitive salt in any suitable manner. The viscosity increasing effect occurs very readily in such preparations. The following examples are illustrative of the preparation of gelatino-silver-halide emulsions in which the viscosity of the gelatin was increased by the addition of the herein described maleamic resins.

Example III

About 0.15% of a vinyl acetate-butyl-maleamic resin was rapidly stirred into an aqueous dispersion containing about 7% of gelatin and silver bromoiodide in an amount usually employed in preparing light-sensitive silver-halide emulsions.

The emulsion is then coated on a suitable base such as a glass plate or film. The coated plate may be exposed and developed in any of the customary photographic developers and fixed in the usual manner to produce a photographic image.

Example IV

Into an aqueous composition containing about 7% of gelatin and having dispersed therein about 4% of silver bromide there was incorporated about 0.1% of methyl-methacrylate-n-butyl-maleamic resin. The mixing takes place at a temperature of about 40° C. and the resulting emulsion is then cast on a suitable base. A rather thick, firm coating is obtained, which possesses good permeability to aqueous solutions employed in the processing of photographic film.

The above examples are merely illustrative of the various kinds of photographic emulsions in which the resins herein described may be utilized to increase the viscosity of the emulsion and thereby permit obtaining layers having a thickness greater than that obtainable under ordinary conditions and without appreciably increasing the total solids content of the emulsion. It is, of course, to be understood that the herein described resins may also be employed in plain gelatin solutions to increase the viscosity of the latter. Such solutions may be applied as an overcoating or backing layer in photographic films to protect against abrasion or static. By the incorporation of appropriate dyes in such gelatin solutions, the dyed solutions may be applied to the film to form filter or anti-halation layers. The coatings obtained from gelatin solutions containing the resins dry to form a clear, transparent layer. It is a feature of the resins herein mentioned that they do not effect the photographic properties of the emulsion layers and are compatible with gelatin. At the same time, they have the further advantage of permitting the formation of thicker layers without attenuation of the silver-halide content and thereby the production of photographic films which yield images of high contrast.

The following examples are illustrative of the method utilized in preparing such resins:

Example V

One mol of vinyl acetate is mixed with one to two mols of maleic anhydride and an equal volume of a suitable solvent, such as acetone. A small amount of benzoyl peroxide ranging from 0.1 to 1%, based on the weight of the monomers, is added and the mixture is heated under reflux until the viscosity of the solution becomes constant. The resin is then precipitated from the solvent by pouring the reaction mixture into a non-solvent such as, for example, benzene or toluene.

To 10 grams of the resin thus prepared, dissolved in 15 mls. of dioxane, there was added 4 grams of butylamine while stirring vigorously. A resinous precipitate formed which dissolved on the addition of a small amount of ethanol. The solution was heated under reflux for two hours, allowed to cool and then diluted with acetone. A water-soluble resinous powder precipitated which may be represented by the following formula:

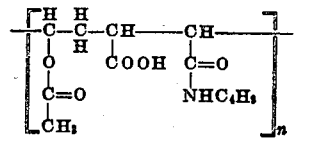

(vinyl acetate-butyl-maleamic resin)

Example VI

The same procedure is followed as in the previous example except that instead of vinyl acetate, methylmethacrylate is utilized. A resin which may be represented by the following structural formula is obtained:

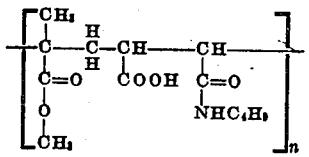

(methylmethacrylate-butyl-maleamic resin)

Example VII 20 grams of the vinyl acetate-maleic anhydride reaction product prepared according to the method described in Example 5 and 10.1 grams of aniline were dissolved in 30 mls. of dioxane. The solution was heated for two hours under reflux, allowed to cool at room temperature and then poured in a fine stream and under vigorous stirring into 200 mls. of benzene.

The powdery mass which precipitated was filtered, washed with benzene and dried.

The resin thus obtained is insoluble in water but very soluble in dilute alkali, such as for example, aqueous solutions of sodium carbonate, sodium hydroxide and the like, and is represented by the following formula:

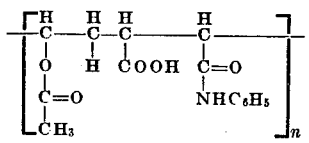

Instead of butylamine in Examples 5 and 6 or aniline in Example 7, there may be utilized with similar results, methyl-, ethyl-, propyl-, hexyl-, cyclohexyl-, dodecyl-, or cyclohexylamine, or morpholine in which case the corresponding maleamic resins are obtained. Each of the resins so obtained may be utilized instead of the specific butyl maleamic resins mentioned in Examples 1–4 to increase the viscosity of gelatin.

This application is a continuation-in-part of my copending application Serial Number 630,687, filed on November 24, 1945, now abandoned.

It is to be understood that the above examples are given by way of illustration and that greater amounts of the viscosity increasing resins than that given in the examples, may be incorporated in the gelatin or that these resins may be incorporated in gelatin solutions of greater concentration. However, it is an advantage of our invention that no matter what the viscosity of the gelatin solution is, it can be increased by the mere incorporation of the resins herein described and by the use of only a small amount of the resin. Thus, it makes possible the use of gelatins which produce such low viscosity solutions that are not in themselves suitable for photographic use. On the other hand, it also makes possible the use of smaller amounts of gelatin than are usually required to produce coatings of any desired thickness.

Another important advantage obtained by my invention is that a greater silver-halide to colloid ratio may be obtained than is possible by the use of untreated gelatin. This advantage is of particular importance in the production of X-ray film since it makes possible a larger ratio of silver-halide in the emulsion thereby imparting greater contrast to the film.

I claim:

1. A composition of matter, having a viscosity greater than that of an aqueous gelatin dispersion, consisting of an aqueous dispersion of gelatin containing from 0.25 to 5% of the dry weight of gelatin of a copolymer of maleic anhydride with a member selected from the class consisting of vinyl acetate and esters of acrylic and methacrylic acid, said copolymer being semi-amidated with an organic amine.

2. A composition of matter, having a viscosity greater than that of an aqueous gelatin dispersion, consisting of an aqueous dispersion of gelatin containing from 0.25 to 5% of the dry weight of gelatin of a copolymer of maleic anhydride and vinyl acetate, said copolymer being semi-amidated with butyl amine.

3. A composition of matter, having a viscosity greater than that of an aqueous gelatin dispersion, consisting of an aqueous dispersion of gelatin containing from 0.25 to 5% of the dry weight of gelatin of a copolymer of maleic anhydride and methylmethacrylate, said copolymer being semi-amidated with morpholine.

4. A composition of matter, having a viscosity greater than that of an aqueous gelatin dispersion, consisting of an aqueous dispersion of gelatin containing from 0.25 to 5% of the dry weight of gelatin of a copolymer of maleic anhydride and methylmethacrylate, said copolymer being semi-amidated with butyl amine.

FRANK J. KASZUBA.

REFERENCES CITED

The following references are of record in the file of this patent:

UNITED STATES PATENTS

| Number | Name | Date |
|---|---|---|
| 2,313,565 | McDowell et al. | Mar. 9, 1943 |

FOREIGN PATENTS

| Number | Country | Date |
|---|---|---|
| 543,855 | Great Britain | Mar. 16, 1942 |